(12) United States Patent
Thawait

(10) Patent No.: US 11,488,219 B2
(45) Date of Patent: Nov. 1, 2022

(54) END-TO-END FOOD DELIVERY ECOSYSTEM

(71) Applicant: Amit Thawait, Waxhaw, NC (US)

(72) Inventor: Amit Thawait, Waxhaw, NC (US)

(73) Assignee: Dishefs LLC, Waxhaw, NC (US)

( * ) Notice: Subject to any disclaimer, the term of this patent is extended or adjusted under 35 U.S.C. 154(b) by 0 days.

(21) Appl. No.: 17/249,142

(22) Filed: Feb. 22, 2021

(65) Prior Publication Data

US 2022/0270145 A1    Aug. 25, 2022

(51) Int. Cl.
| | |
|---|---|
| *G06Q 30/06* | (2012.01) |
| *G06Q 10/08* | (2012.01) |
| *G06Q 20/20* | (2012.01) |
| *G06Q 20/38* | (2012.01) |
| *G06Q 30/02* | (2012.01) |
| *G06F 16/23* | (2019.01) |
| *G06F 16/27* | (2019.01) |
| *G06Q 20/40* | (2012.01) |
| *G06Q 20/12* | (2012.01) |
| *G06Q 20/32* | (2012.01) |

(52) U.S. Cl.
CPC ..... *G06Q 30/0605* (2013.01); *G06F 16/2379* (2019.01); *G06F 16/27* (2019.01); *G06Q 10/0875* (2013.01); *G06Q 20/203* (2013.01); *G06Q 20/208* (2013.01); *G06Q 20/389* (2013.01); *G06Q 20/405* (2013.01); *G06Q 30/0279* (2013.01); *G06Q 30/0633* (2013.01); *G06Q 20/326* (2020.05); *G06Q 20/3274* (2013.01)

(58) Field of Classification Search
CPC ......... G06Q 30/0605; G06Q 10/0875; G06Q 20/203; G06Q 20/208; G06Q 20/389; G06Q 20/405; G06Q 30/0279; G06Q 30/0633; G06Q 20/326; G06Q 20/3274; G06F 16/2379; G06F 16/27
USPC ....................................................... 705/22
See application file for complete search history.

(56) References Cited

U.S. PATENT DOCUMENTS

| | | | |
|---|---|---|---|
| 2004/0117276 A1* | 6/2004 | Kettler, III | G06Q 10/0875 705/29 |
| 2021/0365940 A1* | 11/2021 | Tietzen | G06Q 20/12 |

FOREIGN PATENT DOCUMENTS

| | | | |
|---|---|---|---|
| WO | WO-2020010159 | * | 1/2020 |

* cited by examiner

*Primary Examiner* — Garcia Ade
(74) *Attorney, Agent, or Firm* — Dunlap Bennett & Ludwig, PLLC

(57) ABSTRACT

An online delivery ecosystem enabling buyers/delivery personnel to purchase grocery, restaurants, and other prepared foods on behalf of customers and check out using a mobile application, bypassing traditional person checkout systems, and storing this transaction information to blockchain based systems as immutable systems of record.

3 Claims, 12 Drawing Sheets

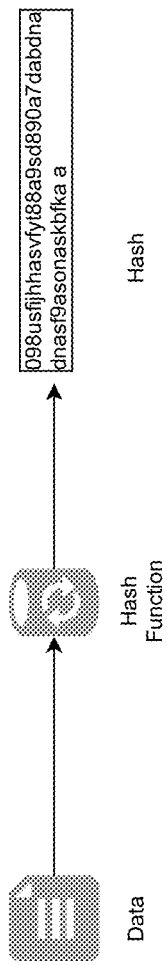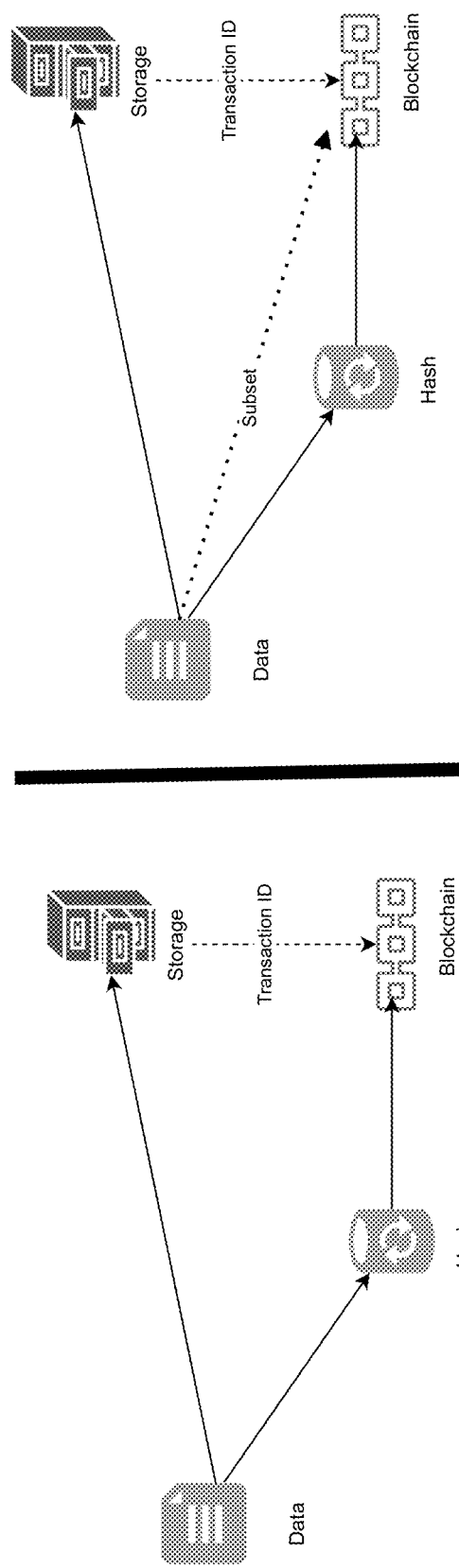

END-TO-END FOOD DELIVERY ECOSYSTEM

BACKGROUND OF THE INVENTION

The present invention relates to online food delivery systems and, more particularly, an online end-to-end food and grocery delivery ecosystem that leverages blockchain technology to facilitate both shopping for grocery, ordering food delivery and takeout from restaurants, food trucks, and/or professional home kitchens, and reducing food waste through enabling donations to Non-Profit entities in a traceable, audible, secure, and efficient manner with end-to-end transparency of processes.

Existing online food ordering and distribution systems have multiple intermediaries between the supplier and the customer. When these layers increase, it also inflates the rates of commission. Data from different sources show that this commission is as high as 20%-30%. While yet the delivery teams involved often argue that they only receive the residual. It is possible to minimize costs by introducing automation and implementing algorithms powered by blockchain technology. If a blockchain solution does not power the food delivery app, it makes it a daunting challenge to hustle the whole process of recruiting a participant on the delivery team.

Current database and the procurement processes for recruiting delivery workers lack rigor to, for instance, identify and vet recruits with previous criminal background history or those who fail to comply with traffic laws. Lack of blockchain solutions limits visibility of multiple transactions like tipping or commissions between online delivery systems, delivery workers and customers. On the other hand, infusing blockchain technology into a food delivery app enables prevention of food spoilage as well as providing authentic off-menu cuisines to customers with simple clicks.

As can be seen, there is a need for an online end-to-end food and grocery delivery ecosystem that leverages blockchain technology to facilitate both shopping for food, ordering food for delivery, and enabling donations to Non-Profit entities of through identifying excessive waste in a traceable, audible, secure, and efficient manner with end-to-end transparency of processes, whereby centralized layers and intermediaries are replaced with the present invention that promotes enhanced security and strengthened growth. The Non-Profit entities may include, but are not limited to, food pantries, foodbanks, local shelters, and any chartable entity that needs food to feed the less fortunate.

The goal is to track products from farm to fork using blockchain and internet of things (IoT) enabled technologies. By creating traceable and transparent supply chains for food, consumers can attain the information they need to make informed choices about the food they buy and the companies they support. For stakeholders in the food supply chain, having traceability and transparency builds better relationships with their customers, increases efficiency, and reduces the risk and cost of food recalls, fraud, and product loss. The blockchain technology creates an opportunity to fix and transform the world's food system.

Due to COVID 19, the food service industries are struggling to run the business as customers are choosing not to eat outside and instead relying more on online delivery and take-home services: squeezing out valuable food suppliers.

The present invention offers one stop shop for groceries and prepared foods. Additionally, the present invention embodies a platform that bridges the gap of unemployed staff or struggling restaurant's owners to rent their commercial kitchens to home entrepreneurs and allow restaurants and entrepreneurs to donate surplus food to nearby food-pantries and complying all the state and federal regulations.

Specifically, by embedding blockchains in relational tables, the database stores trust related information in a tamper-proof fashion, making the data provenance provably verifiable. Currently there is no platform which offers aforementioned grocery, restaurant's food and regional cuisine order to delivery experience using a distributed electronic ledger providing various capabilities, including traceability, audibility, security, and efficiency with end-to-end transparency of processes. Moreover, currently there are no online food/grocery delivery providers partnered with non-profit organizations to prevent food waste, track their Non-Profit food donations in immutable records from the donor to the non-profit entity, and issue electronic receipt fulfilling their actual obligations.

Current online food delivery and surplus Non-Profit food donations systems are built in client-server centralized system. Centralized databases record present information only, they do not trace information that was previously recorded. With blockchains, the case is different. They not only keep information that is relevant in real-time but also can trace back information of transactions that have come before. Blockchains can create databases that have histories of themselves, i.e., they grow like ever-expanding archives of their own history. A blockchain uses a peer-to-peer or P2P network architecture. It does not require access to a centralized database, instead all participating nodes in the network can connect with each other. There is no "master" that controls all nodes. Each peer is equal to each other in how they access the blockchain without requiring administrator oversight and thus administrator fallibility.

The primary difference between a blockchain and a database is centralization. In contrast, all records secured on a database are centralized, each participant on a blockchain has a secured copy of all records and all changes so each user can view the provenance of the data. The magic happens when there is an inconsistency—since each participant maintains a copy of the records, blockchain technology will immediately identify and correct any unreliable information. Current system neither offer this functionality nor they are integrated to through the soup to nuts of ordering grocery, ordering prepared food, and donation of surplus grocery and prepared foods to nonprofits.

The software application, through online resources, unite grocery, prepared (restaurant and regional cuisine that is prepared at home or in a vehicle). Customers will have flexible options to choose individual or group plans and schedule their delivery in advance, request grocery items, access food recipes they wish to enjoy making on their own, surprise menus set based on chefs' choice and customer eating patterns, and the like. The software application will offer restaurants owners and culinarians to earn additional income by sharing space and meals with desired customers. The strict security measures protect the transactions and information from frauds, and data tampering. With food tests, the possibility of foreign matters in the food items could be detected, along with minute details like a batch of food, timings for execution, etc. With blockchain technology the tracking of food items is very easy. Barcodes, QR code, and the like makes the job much easier for companies. Moreover, businesses can regulate who gets access to see the information of products.

The present invention embodies an integrated mobile and web application that will be one stop shop for customers to order grocery items from grocery stores and to order prepared food from restaurants and will also serve as link for donation of the excess food (prepared at restaurants or stored at grocery stores) to the Non-Profit entities in need. This online application will connect customers and nonprofit organizations with the food services and will enable the restaurant owners, grocery owners and regional cuisine (kitchen) owners to list their leftover food and reach to the needy.

Also, most of the people far from home want to eat food that tastes close to their home and culture. The software application embodied in the present invention is adapted to connect those people to certain chefs that make signature dishes not found in any restaurant's menu. Additionally, this application aims at transparency around how much of the tip on any given delivery order goes to the delivery worker. To enable better transparency and a single source of truth for all the stakeholders, blockchain technology will be used.

The present invention relates to distributed electronic ledger or blockchain self-checkout-based technologies providing end-to-end transparency of order to delivery experience for online ordering of perishable food so that surplus food is efficiently donated to Non-Profit entities. For example, if a customer added grocery and meals through the app for checkout and added a tip amount for the buyer, then the buyers will have full transparency on the tip amount, his base pay and additional incentive he has received as part of order. In another example, restaurant owners can donate surplus consumable food and get the benefit of tax advisement. Blockchain can provide buyers, restaurant owners and Non-Profit entities with the opportunity to account for their activities, track immutable records, pass foods from the donor to the non-profit, and issue electronic receipt fulfilling their actual obligations.

By being provided traceability and transparency in this supply chains for food, consumers can attain the information they need to make informed choices about the food they buy and the companies they support. For stakeholders in the food supply chain, having traceability and transparency builds better relationships with their customers, increases efficiency, and reduces the risk and cost of food recalls, fraud, and product loss. For grocery, restaurants, regional cuisine outlets (e.g., home cooking), the present invention may use self-checkout technologies, enabling the buyers/delivery personnel check out through a mobile application.

Current systems have buyers fulfill orders at a physical retailer on behalf of customers, using a cyber shopping service system. Once a buyer has collected one or more items for purchase, the buyers/delivery personnel must wait in line or use self-serve checkout station to pay for the items according to the traditional check-out process. This is a time-consuming process, and because buyers/delivery personnel use a mobile device to scan and record items each item picked up for purchase, involves redundant activity. A more efficient check-out process allows the buyers/delivery personnel to complete purchase of selected items on his/her mobile device, thereby eliminating unnecessary actions and reducing the time required to complete an order.

SUMMARY OF THE INVENTION

The present invention enables customers to purchase grocery, prepared food which is not easily available in the restaurants while using distributed ledger (blockchain) technology to provide traceability, audibility, security, and efficiency with end-to-end transparency of processes. Restaurants owners will have online application to upload their menu, set the price and donate surplus food to local communities. Customer can place an order for them and/or on behalf of their loved ones for grocery shopping, restaurants food or regional cuisine home cooking. Buyers will have options to accept an entirety of an order or select a portion of the order from the customer order batch. Buyer drivers can orchestrate and plan the logistics of delivering the order and suggest delivery times to customer. For restaurants and other preparers of prepared food (such as cooks of regional cuisine who may be looking to commercial kitchen space), buyers/delivery personnel will pick up and deliver the order. Restaurant owners can submit surplus food donation to multiple local non-profit entity. Non-Profit entity can schedule their own pickup or use cyber shopping system to request a pickup. For grocery shopping it enables a buyer to bypass a physical check-out process at a retailer by completing his/her purchase via a mobile application on the phone of the buyers/delivery personnel.

In one embodiment, the buyer is shopping at the retailer on behalf of a customer, who specified a list of items for the buyers to purchase via the cyber shopping service. The customer places an order using a website or client application that communicates with the online smart system. The order specifies one or more items to be purchased at a retailer, restaurants, or regional cuisines. The cyber shopping service collects payment from the customer and transmits the order to a buyers/delivery personnel. The buyers/delivery personnel travels to one or more retailers, restaurants, or regional cuisines to fulfill the order. While at a grocery retailer, the buyers/delivery personnel collect and scan each item using a buyers/delivery personnel mobile application that runs on the buyers/delivery personnel's mobile device. The buyers/delivery personnel mobile application records each item and associated item information describing each product and adds items in the cart for purchase. The buyers/delivery personnel mobile application transmits information describing the cart to the online smart system, which determines a total value for the items in the cart. The cyber shopping service transmits payment to a system associated with the retailer, thereby completing purchasing items from the cart, and it also stores transaction information (hash key #) to blockchain based systems (Hyperledger, C-RDA, etc.) as immutable systems of record. The buyers/delivery personnel then leave the store, restaurant, regional cuisine and delivers the purchased grocery items and food to the customer or food pantry (as requested by customer). Once order has been placed and buyers receives it, buyers will have transparent access to the tip amount that has been allocated by the customer. Regulators will be able to access Blockchain Explorer to view the complete journey of the transaction from restaurant owners placing a donation request to delivering it to nonprofit organization.

The present invention offers customers to purchase grocery, restaurants food and regional cuisine authentic food, which is not easily available in the restaurants while using distributed ledger (blockchain) technology to provide traceability, audibility, security, and efficiency with end-to-end transparency of processes.

The customer places an order using a website or client application that communicates with the online BMA (buyer's mobile application) system. The order specifies one or more items to be purchased at a retailer, restaurants, or regional cuisines. The cyber shopping service collects payment from the customer and transmits the order to a buyers/delivery personnel. The buyers/delivery personnel travels to one or more retailers to fulfill the order.

While at a grocery retailer, the buyers/delivery personnel collect and scan each item using a buyers/delivery personnel mobile application that runs on the buyers/delivery personnel's mobile device. The BMA records each item scan by the application and associated item information describing each product, and then the application adds items in the cart for purchase. The BMA determines a total value for the items in the cart. The cyber shopping service transmits payment to a system associated with the retailer, thereby completing purchasing items from the cart, it also stores transaction information (hash key #) to blockchain based systems (Hyperledger, C-RDE, etc.) as immutable systems of record. The buyers/delivery personnel then leave the store, restaurant, regional cuisine and delivers the purchased grocery items and food to the customer or food pantry (as requested by customer).

In another embodiment, the buyers/delivery personnel perform an accelerated check-out using his/her specialized mobile application at grocery retailers. Once the buyers have collected the items requested in the order, the buyer's mobile application programmatically connects to the retailer system, performs checkout and stores the receipt for the order with a QR code or the like. A cashier, employee, or automated scanner at the physical check-out scans QR code/ order details, verifying and confirming the order details.

Regional cuisine chefs will have access to nearby state approved commercial kitchens to rent a kitchen and prepare food to customer or buyers to deliver food to customers. Restaurant owners will receive a receipt for the surplus food donation and maintains a record in the distributed blockchain (Hyperledger) chain system.

In one aspect of the present invention, a system for facilitating the ordering of food products, the system includes the following: (a) a food shopping service comprising an order management engine and a plurality of relational databases coupled to a blockchain chain system; (b) a plurality of food retailers, each retailer comprising a retail server in electrical communication with an inventory database of the plurality of relational databases; (c) an ordering entity, the ordering entity comprising a first computing device in electrical communication with the order management engine, the ordering entity creating an itemized list comprising one or more items, the itemized list being received by the food shopping service, the order management engine translating the itemized list into one or more batch orders associated with one or more of the plurality of retailers, as a function of the inventory database, and the one or more batch orders being stored by the cyber shopping service in the plurality of relational databases; (d) a food buyer, the food buyer comprising a second computing device in electrical communication with the order management engine and the plurality of food retailers, the food purchaser retrieving the one or more batch orders using the second computing device; wherein the order management engine is configured to translate the retrieved batch orders to an identifiable list displayed on the second computing device; wherein the identifiable list is manipulated by the food buyer through scanning an item from the itemizable list at a physical premise associated with one of the plurality or retailers; and said item is updated, by the order management engine, on a transactional records database of the plurality of relational databases synchronically with each scanning.

In another aspect of the present invention, the system for facilitating the ordering of food products includes the following: a value channel coupled to the order management engine, wherein the order management engine determines a value a value for each item on the identifiable list as a function of the inventory database, wherein said value is retrievable stored in the transactional record database, wherein the ordering entity transmits the value through the value channel, and wherein the value channel is configured to transmit said value to the retailer associated with the physical premise, the food buyer does not transmit the value, wherein the second computing device is configured to generate a barcode associated with identifiable list and said value, and wherein the retail server is configured to read the barcode, wherein the plurality of relational databases comprises a customer database, wherein the customer database comprises one or more restriction rules, wherein the inventory database comprises one or more purchase rules, and wherein the second computing device is configured to analyzed the one or more restriction and purchase rules for determining an allowability of each item on the identifiable list, wherein the second computing device is configured to transmits to the order management engine, a dispatchment notification indicating each allowability, wherein the indicating that said menu item is being dispatched, wherein the dispatchment notification is received by the customer, wherein the transactional record database records a tip value associated with each said value, wherein the order management engine is configured to determine a donation as a function of the inventory database, whereby the donation is delivered to a non-profit entity.

These and other features, aspects and advantages of the present invention will become better understood with reference to the following drawings, description and claims.

BRIEF DESCRIPTION OF THE DRAWINGS

FIG. 1C is a blockchain-based schematic view of an exemplary embodiment of the present invention;

FIG. 1D is a blockchain-based schematic view of an exemplary embodiment of the present invention;

FIG. 1E is a blockchain-based schematic view of an exemplary embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Referring now to FIGS. 1 through 6A, the present invention includes an online end-to-end food delivery system that leverages blockchain technology.

Figure 1A:
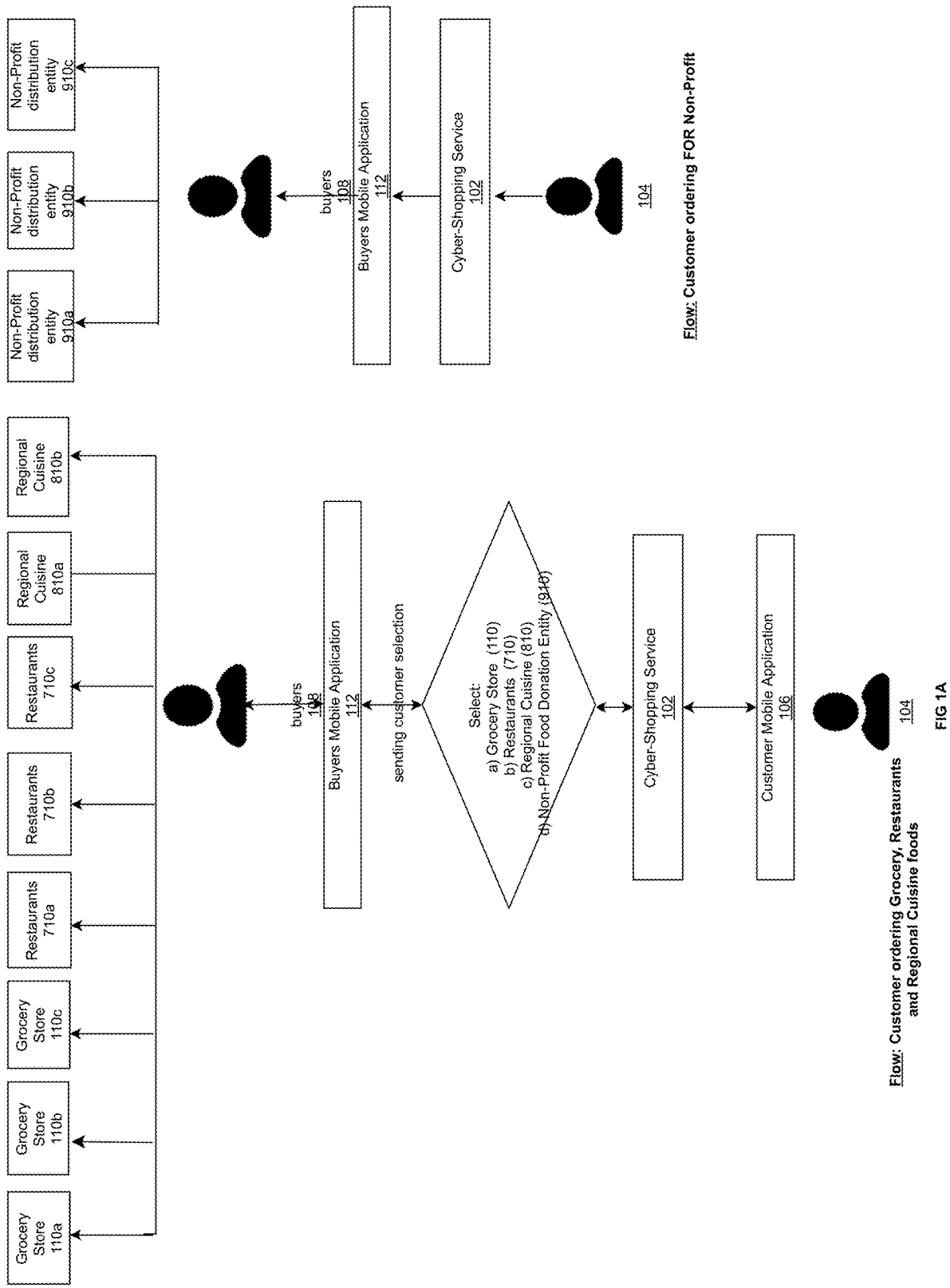
FIG. 1A is a schematic view of an exemplary embodiment of the present invention, illustrating customer mobile workflow thereof.
Figure 1B:
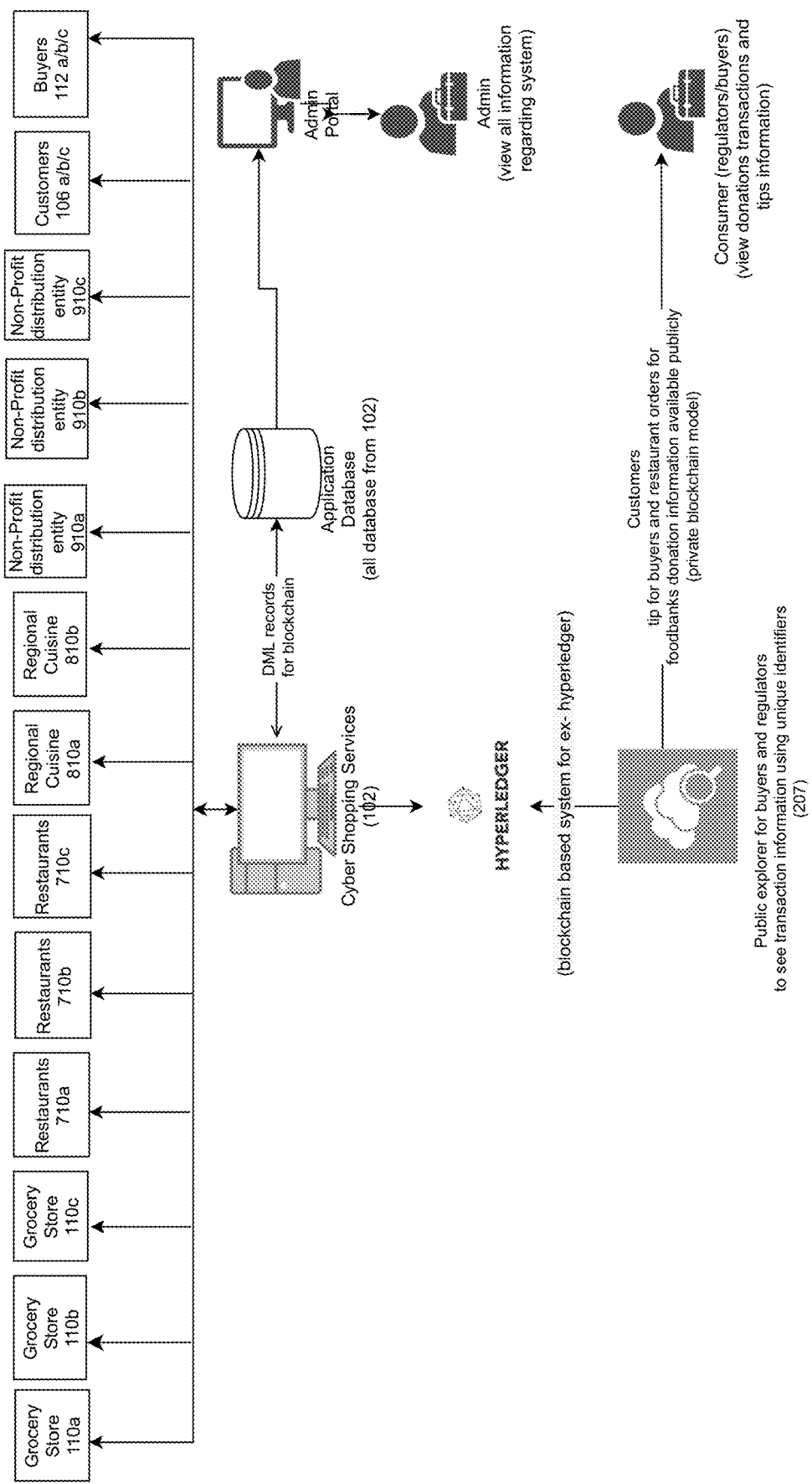
FIG. 1B is a schematic view of an exemplary embodiment of the present invention, illustrating a blockchain-based application workflow thereof.

FIG. 1 illustrates the environment of a cyber shopping assistance platform, according to one embodiment. The systemic platform includes a cyber shopping service (CSS) 102. The CSS 102 is configured to receive orders from one or more customers 104 (only one is shown for the sake of simplicity).

An order may be selected from a list of items provided by a one or more retailers, such as but not limited to a grocery store 110a-110c, a restaurant 710a-710c, a regional cuisine 810c-810b, or the like. The ordered items are delivered to the customer 104 or as a donation to a Non-Profit entity 910.

In some embodiments, the order specifies from which retailer the selected items should be purchased. The customer may use a customer mobile application (CMA) 106 to place the order; the CMA 106 is configured to communicate with the CSS 102.

CMA 106 will also allow customer 104i to order on behalf of other customer 104ii via app, wherein some embodiments, CMA 106 may facilitate group conversation between customer 104i and customer 104ii so that buyers will be shopping for customer 104i's order and delivering to customer 104ii per customer 104i request.

The CSS 102 is configured to transmit orders received from customers 104 to one or more buyers/delivery personnel 108. A buyer 108 may be a contractor, contractor, employee, or other person (or entity) who is enabled to fulfill orders received from the CSS 102.

As mentioned above, the ecosystem or platform includes a plurality of retailers 110a, 110b, and 110c, three restaurants (710a, 710b, 710c), a plurality of regional cuisine owners (810a, 810b, 810c) and plurality of food banks locations (910a, 910b, 910c (only three are shown for the sake of simplicity; the environment could include hundreds of retailers). Each buyer 108 fulfills an order received from the CSS 102 at one or more retailers 110, restaurants 710, and regional cuisines 810 and delivers the order to the customer 104 or Non-Profit Entity 910. In one embodiment, buyers/delivery personnel 108 make use of a buyers/delivery personnel mobile application (BMA) 112 which is configured to interact with the CSS 102.

As part of fulfilling an order, an order fulfillment smart engine (OFSE) 206 may access a customer database 214 which stores information describing each customer. This information could include each customer's name, address, gender, shopping preferences, favorite items, stored payment instruments, and so on. The CSS 102 may include the OFSE 206 which is configured to synthesize and display an ordering interface to each customer 104 (for example, via the CMA 106). The OFSE 206 may also configured to access the inventory database 204 to determine which products are available at which retailers 110, restaurants 710 and regional cuisines 810. The OFSE 206 may determine a systemic sale price for each item ordered by a customer 104. The systemic sale prices set by the OFSE 206 may or may not be identical to in-store prices determined by retailers 110, restaurants 710, and regional cuisine 810. The systemic sale price may be the price that customers 104 and buyers/delivery personnel 108 would pay at the retailer 110, restaurants 710, and regional cuisine 810. Note, if the retailer changes the price based on demand or availability of items for any reason and the actual price at the store has changed, between the time the order was placed by the customer and when the buyer actually starts shopping, there is a chance of the price difference. In such cases, there will be an adjustment posted on the final bill/receipt.

The OFSE 206 also facilitates transactions associated with each order. The OFSE 206 charges a payment channel associated with a customer 104 when he/she places an order. The OFSE 206 may transmit payment information to an external payment gateway or payment processor. The OFSE 206 stores payment and transactional information associated with each order in a transaction records database 208. Additionally, the OFSE 206 will assist food providers (retailer 110, restaurants 710, and regional cuisine 810) to place donation order for group of Non-Profit entities 910 to secure donations as it is available and allow Non-Profit entities to schedule their pickups for donations or request buyers to deliver the donations by paying delivery fees. Order transactions are stored in the relational database as well as blockchain chain system (BCS) 207 synchronically.

Figure 2:
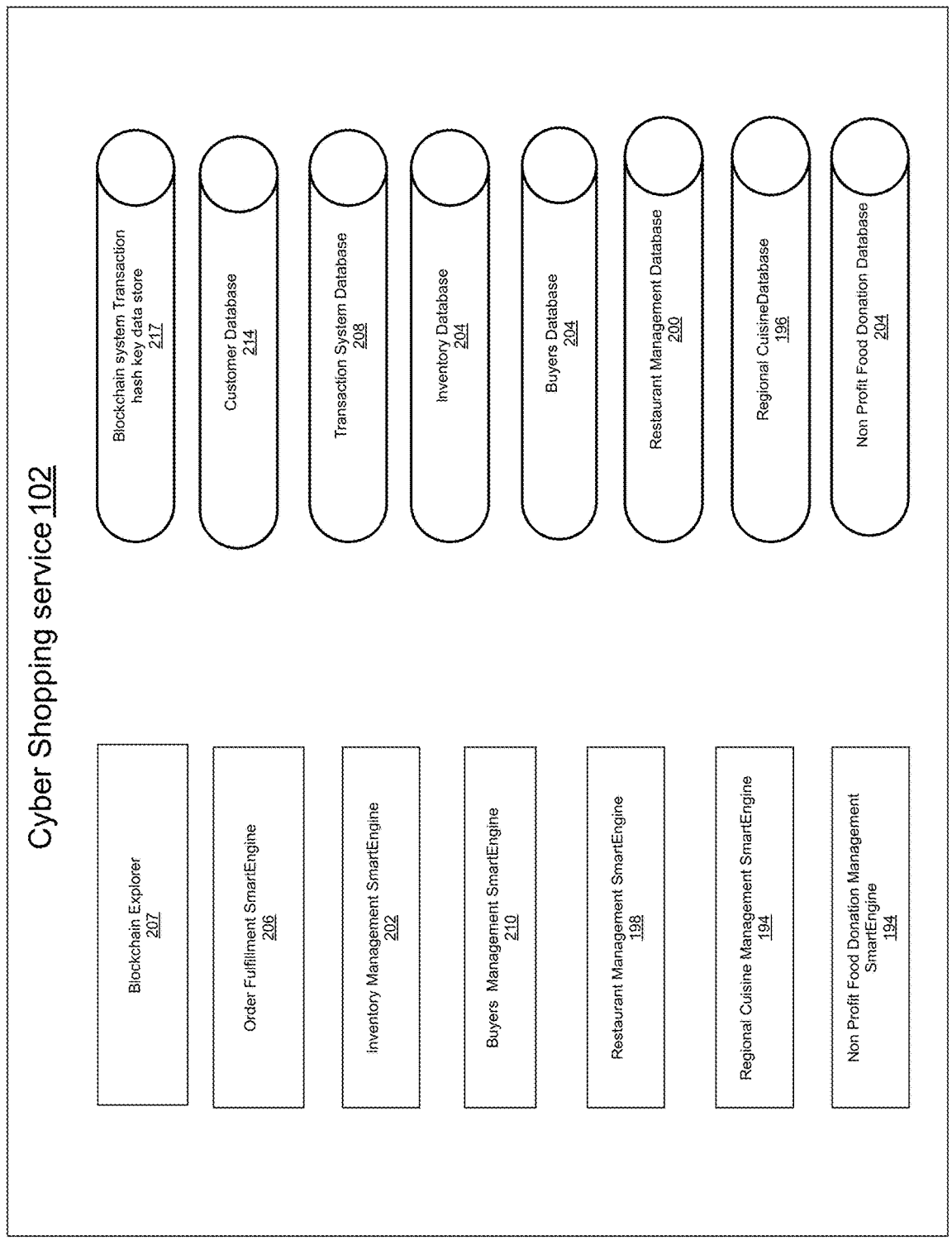
FIG. 2 is a schematic view of an exemplary embodiment of the present invention, illustrating a cyber showing service thereof.

FIG. 2 is a diagram of a CSS 102. The BMA 112 includes an inventory management smart engine (IMSE) 202, which interacts with inventory systems associated with each retailer 110, restaurants 710, and regional cuisine 810. The IMSE 202 requests and receives inventory information maintained by the retailer 110, restaurants 710, and regional cuisine 810. The inventory of each retailer 110, restaurants 710, regional cuisine 810 is unique and may change over time. The IMSE 202 monitors changes in inventory for each participating retailer 110, restaurants 710, regional cuisine 810. The IMSE 202 is also configured to store inventory records in an inventory database 204. The inventory database 204 may store information in separate records, one for each participating retailer 110, restaurants 710, regional cuisine 810, or may consolidate or combine inventory information into a unified record. Inventory information includes both qualitative and qualitative information about items, including size, color, weight, SKU, serial number, and so on. The inventory database 204 also stores purchasing rules associated with each item if they exist. For example, age-restricted items such as alcohol and tobacco are flagged accordingly in the database 204. Inventory management through IMSE 202 also manages food providers donations to Non-Profit entities based on each Non-Profit entity's inventory, thereby donations may be done "in advance", allowing Non-Profit entities to schedule their pickups.

The buyers/delivery personnel management smart engine (BMSE) 210 may interact with the BMA 112, which manages communication with and utilization of buyers/delivery personnel 108. In one embodiment, the BMSE 210 receives a new order from the OFSE 206. The BMSE 210 identifies the appropriate buyers 108 to fulfill the order based on one or more parameters, such as the buyers/delivery personnel's proximity to the appropriate retailer 110 (and/or to the customer 104), his/her familiarity level with that particular retailer 110, restaurants 710, regional cuisine 810, 910 Non-Profit entity and so on. Additionally, the BMSE 210 accesses a buyers database 212 which stores information describing each buyers 108, such as his/her name, gender, rating, previous shopping history, and so on.

In some embodiments, the OFSE 206 also shares order details with retailers 110, restaurants 710, regional cuisine 810 and 910. For example, after successful fulfillment of an order, the OFSE 206 may transmit a summary of the order to the appropriate retailer, restaurants, regional cuisine. The summary may indicate the items purchased, the total value of the items, and in some cases, an identity of the buyers 108 and customer 104 associated with the transaction. In one embodiment, the OFSE 206 pushes transactions and/or order details asynchronously to retailer, restaurants, and regional cuisines systems. This may be accomplished via use of webbook's, which enable programmatic or system-driven transmission of information between web applications. Retailer, restaurants, and regional cuisine systems may be configured to periodically poll the OFSE 206, which provides detail of all orders which have been processed since the last request.

In some embodiments, the blockchain explorer retrieve transaction information from 217 which is private blockchain available for buyers and regulators to enable better transparency and a single source of truth for all the stakeholders. For example, after successful fulfillment of an order, the OFSE 206 may transmit a summary of the order to the appropriate retailer, restaurants, regional cuisine. The summary may indicate the items purchased, the total value of the items, and in some cases, an identity of the buyers 108 and customer 104 associated with the transaction. Buyers may verify tip information by filtering transaction ID from blockchain explorer likewise regulators will have access to view complete journey of the transaction.

FIGS. 1B through 1E are diagrams of a blockchain based application flow. In some embodiments, the CSS 102 will accept transactions request from grocery retailers, restaurants, regional cuisines, Non-Profit entities, buyers and customers. CSS 102 then transmits data to the systemic relational databases and the system administrator can query data directly from these relational databases for further analysis. CSS 102 may insert data respective to each step in the process to blockchain (via Hyperledger API's) which can be easily accessible on the basis of order ID.

Figure 3A:
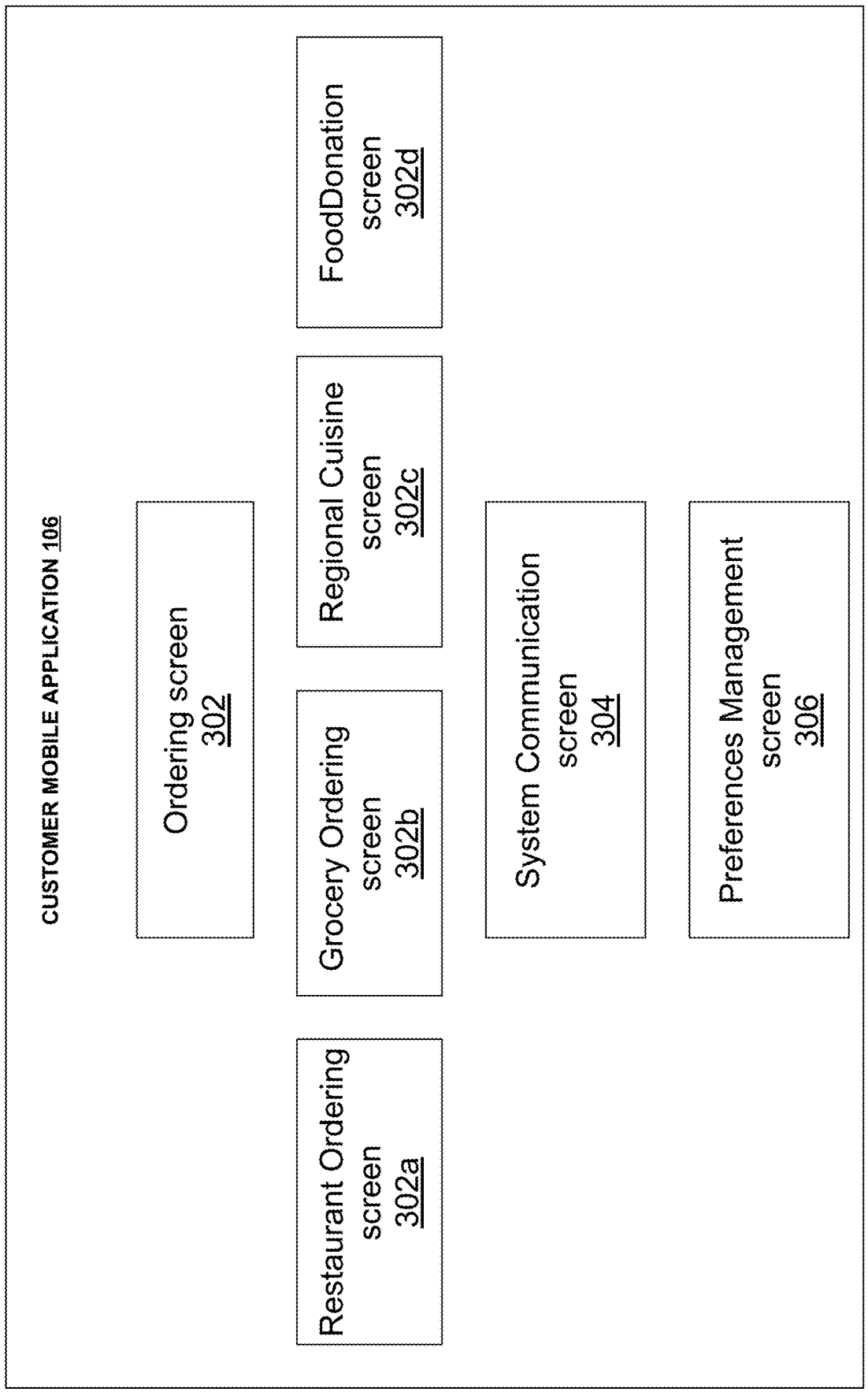
FIG. 3A is a schematic view of an exemplary embodiment of the present invention, illustrating a custom mobile application thereof.

FIG. 3A is a diagram of the CMA 106. The CMA 106 includes an ordering interface 302, which provides an interactive interface with which the customer 104 can browse through and select products (restaurant ordering 302a, grocery ordering 302b, and regional cuisine 303c) and place an order. The CMA 106 also includes a system communication interface 304 which, among other functions, receives inventory information from the CSS 102 and transmits order information to the system 206. The CMA 106 also includes a preferences management interface 306 which allows the customer 104 to manage basic information associated with his/her account, such as his/her home address and payment channels. The preferences management interface 306 may also allow the user to manage other details such as his/her favorite or preferred retailers 110, preferred delivery times, special instructions for delivery, and so on.

Figure 3B:
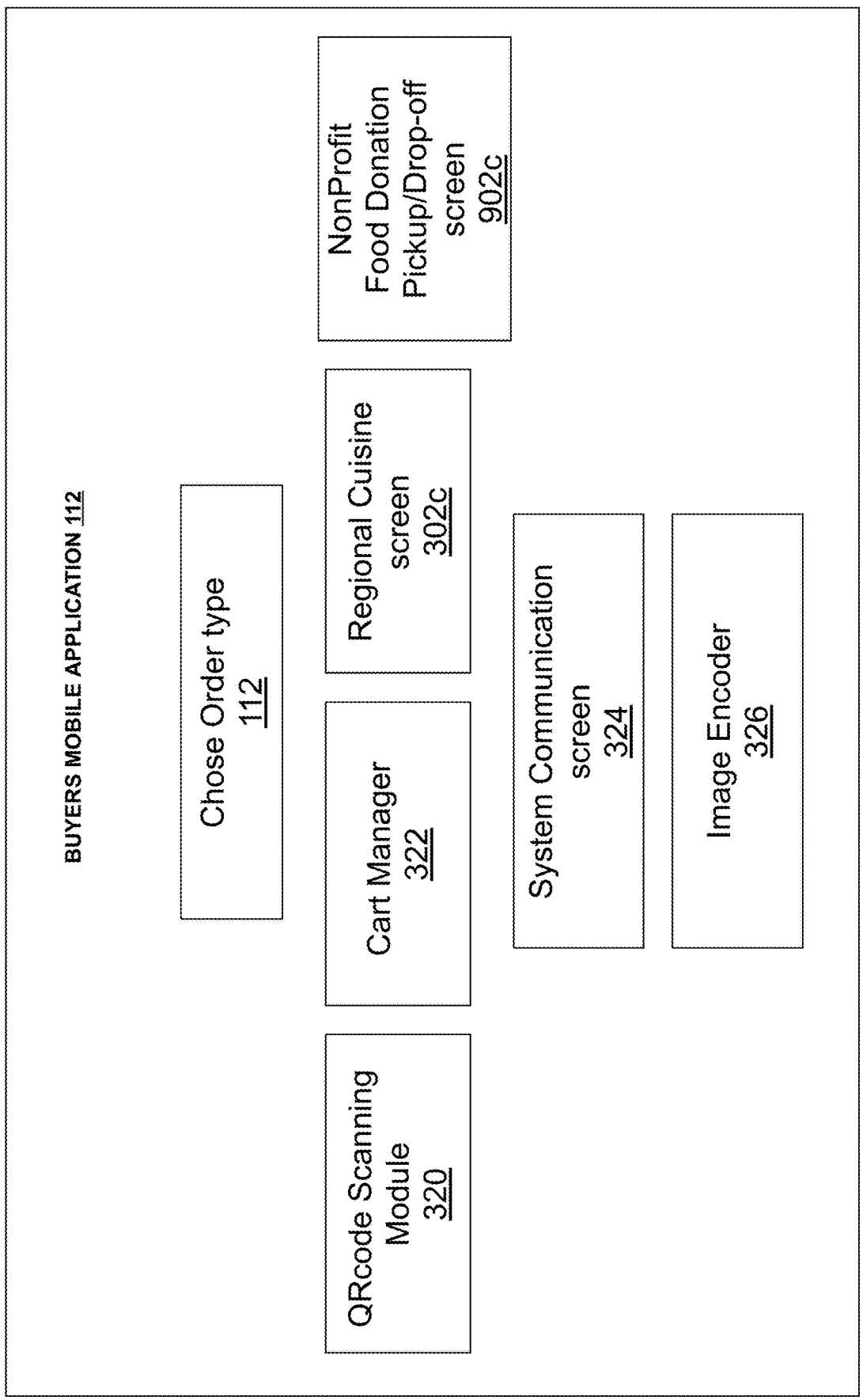
FIG. 3B is a schematic view of an exemplary embodiment of the present invention, illustrating a buyers mobile application thereof.

FIG. 3B is a diagram of the BMA 112. The BMA 112 includes a QR code scanning module 320 which allows a buyer's 108 to scan an item at a retailer 108 (such as a box of cereals on the shelf at a grocery store). The barcode scanning module 320 may also include an interface which allows the buyers/delivery personnel 108 to manually enter information describing an item (such as its serial number, SKU, quantity and/or weight) if a barcode is not available to be scanned. BMA 112 also includes a cart manager 322 which maintains a running record of items collected by the buyers/delivery personnel 108 for purchase at a retailer 110. This running record of items is commonly known as a "cart". In one embodiment, the barcode scanning module 320 transmits information describing each item (such as its cost, quantity, weight, etc.) to the cart manager 322, which updates its cart accordingly. The BMA 112 also includes a system communication interface 324 which interacts with the CSS 102. For example, the system communication interface 324 can both receive an order from the CSS 102 and, separately, transmit contents of a cart of items to the CSS 102. The BMA 112 communicates with retailer payment gateway and perform final checkout from the app. For example, buyers add customer's items into the cart and pay directly from the app to retailers, upon successful payment, retailers generate a QR code which can then be scanned by an employee of the retailer 110 if needed to verify the transaction. For restaurant and regional cuisines 302 and food pickup screen 902 submits order to cyber shopping system and cyber shopping system transmits information to buyer to collect the order and deliver it to the customer.

As described with reference to FIG. 3A, the CMA 106 is used by the buyers to scan and record pricing, quantity, and other information describing each item in an order. The barcode scanning module 320 allows a buyers/delivery personnel 108 to simply scan a barcode attached to an item (or enter information manually if necessary); the cart manager 322 maintains and updates a record of all items being collected by the buyers/delivery personnel 108 for a particular order. In some embodiments, the BMA 112, subsequent to receiving an identification of items for purchase, can perform a "bypass checkout" in which it transmits payment to the appropriate retailer 110 on behalf of the buyers/delivery personnel 108, thereby removing the need for the buyers 108 to wait in line at a physical point-of-sale (such as a check-out counter) within the retailer. Restaurant and regional cuisines 302 and food pickup screen module may transmit information to buyer to collect the order and deliver it to the customer. CSS 102 will group the order and release to nearest buyer location to offer maximum delivery of an order to the customer.

Figure 4A:
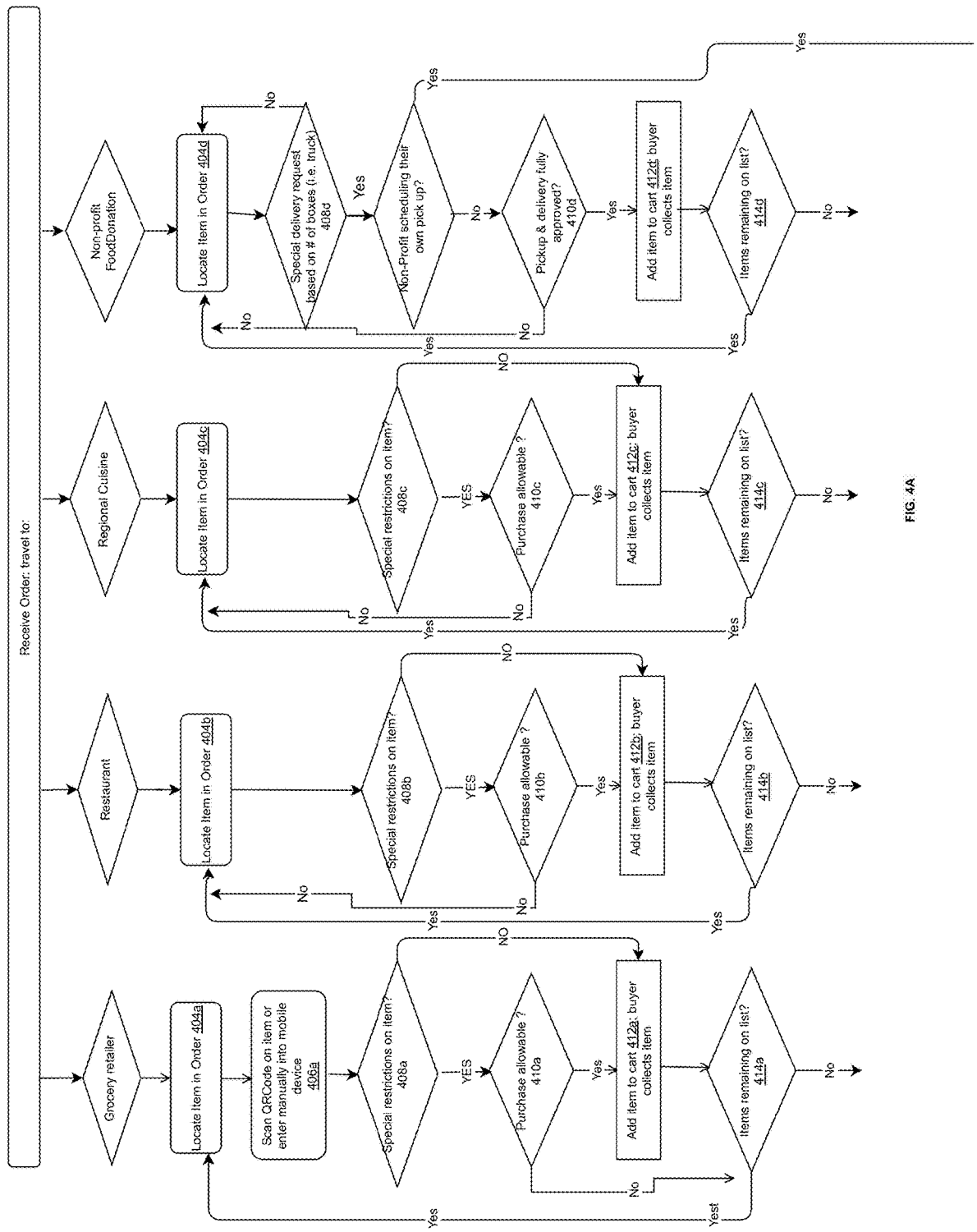
FIG. 4A is a flowchart of an exemplary embodiment of the present invention, illustrating a buyers workflow thereof.
Figure 4B:
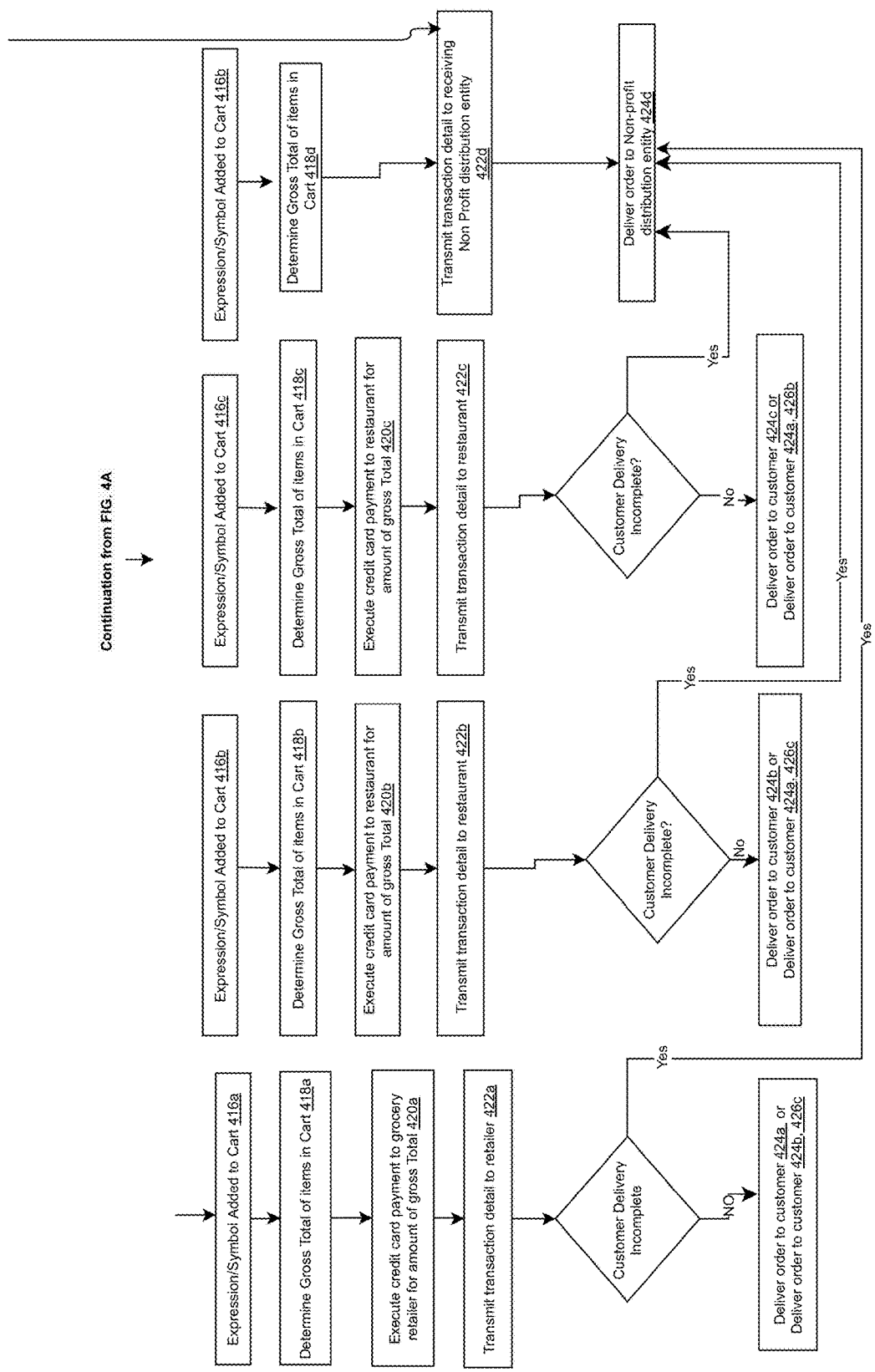
FIG. 4B is a continuation of FIG. 4A.

FIGS. 4A and 4B illustrate the process of performing a bypass checkout using a buyers/delivery personnel mobile application. A buyers/delivery personnel receives an order to be fulfilled (from the CSS 102) and travels to an appropriate retailer, restaurants, and regional cuisines. The appropriate retailer, restaurants, regional cuisines may be communicated by the CSS 102 along with the order details, or it may be left to the discretion of the buyers/delivery personnel. The buyers/delivery personnel locate an item specified by the order 404a, 404b, 404c, and/or 404d. The buyers/delivery personnel scans 406a the item using a buyers/delivery personnel mobile application (part of BMA 112); the buyers/delivery personnel may also manually enter product and pricing information associated with the item if necessary. The BMA 112 determines if one or more special restrictions 408a, 408b, 408c, 408d are associated with the item. As described previously, special restrictions include age restrictions (for alcohol, tobacco, peanut allergies products), quantity/count restrictions (for high-demand items), and so on.

If the mobile BMA determines that special restrictions do not apply, it simply adds 412a, 412b, 412c, and 412d the item to a digital cart which lists all items currently marked for purchase.

If the BMA 112 determines that special restrictions do apply, it then determines 410a, 410b, 410c, 410c if the purchase is allowable. This could include looking up the age of the customer (to see if he/she is old enough to purchase alcohol or any peanut allergies have been noted) or counting how many instances of the item have already been collected for purchase (in the case where a retailer institutes a purchase limit for each customer or additional dietary restrictions have been noted by customers).

The BMA 112 determines allowability by requesting information from the CSS 102. For example, the inventory management smart-engine extracts purchasing rules from the inventory database 204 and transmits them to the BMA 112. In another embodiment, the BAM 112 maintains a local record of purchasing rules and accesses or references it as required.

Returning to FIGS. 4A and 4B, if the buyers mobile application determines that purchase of the item is allowable, it adds 412*a*, 412*b*, 412*c*, 412*d* the item to the digital cart. At the same time, the buyers/delivery personnel physically collect the item. If the BMA 112 determines that purchase of the item is not allowable, then the application determines 414*a*, 414*b*, 414*c*, 414*d* if any items are remaining on the order. If there are, the buyers/delivery personnel proceeds to locate 404 the item (and continue as previously described). If not, the BMA 112, responding to input from the buyers/delivery personnel, adds an "expression" 416*a* to the cart. "Expression" involves determining a final list of items for purchase. In one embodiment, the BMA 112 transmits an identification of each item to the shopping assistance platform, which matches each item against the customer order and verifies that the order has been fulfilled.

Subsequently, the BMA 112 determines 418*a*, 418*b*, 418*c*, 418*d* a total systemic sales price or gross merchandise value (GMV) for the cart of items. The GMV reflects the price that a customer would pay at a physical point of sale within the store. Expression may also involve determining whether one or more discounts, promotions, or other price changes apply, and adjusting the GMV accordingly. The BMA 112 then directs the CSS 102 to execute 420*a*, 420*b*, 420*c* a credit card payment to the retailer in the amount of the GMV. Currently or some time thereafter, the BMA 112 transmits 422*a*, 422*b*, 422*c*, 422*d* details of the transaction to the retailer. The details include which items were purchased and how much was paid for each. Asynchronously, the buyers deliver 424*a*, 424*b*, 424*c* and 424*d* the order to the customer. Non-Profit entities usually send their own personnel's to collect surplus food order generated by restaurants, though in some cases a Non-Profit entity does not have pickup personnel, they can request buyers (delivery personnel) for pickup an order from the restaurants 424*d*.

Figure 5:
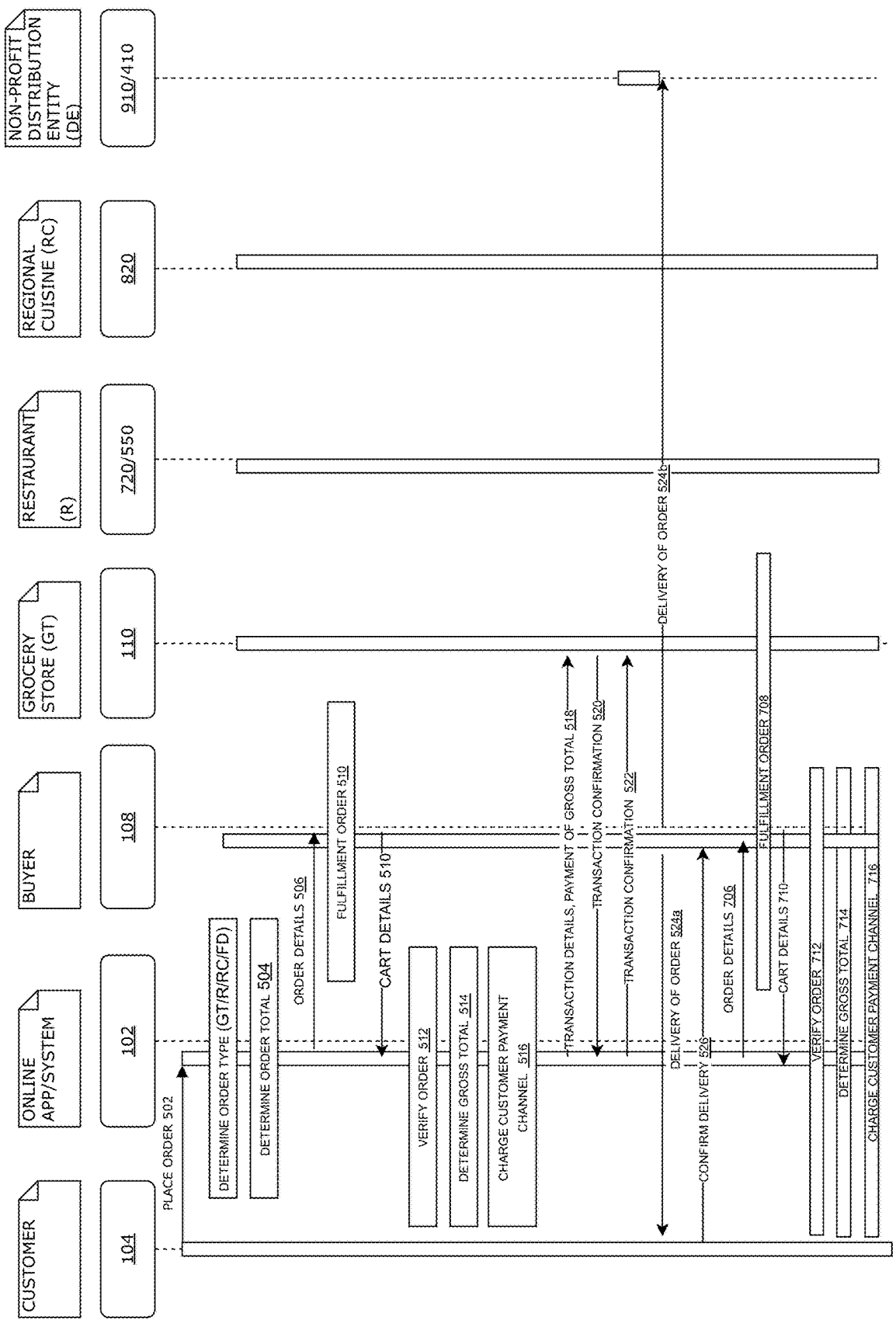
FIG. 5A is a sequence diagrammatic view of an exemplary embodiment of the present invention, illustrating a cost saving direct transaction thereof.
FIG. 5B is a continuation of FIG. 5A.
Figure 5:
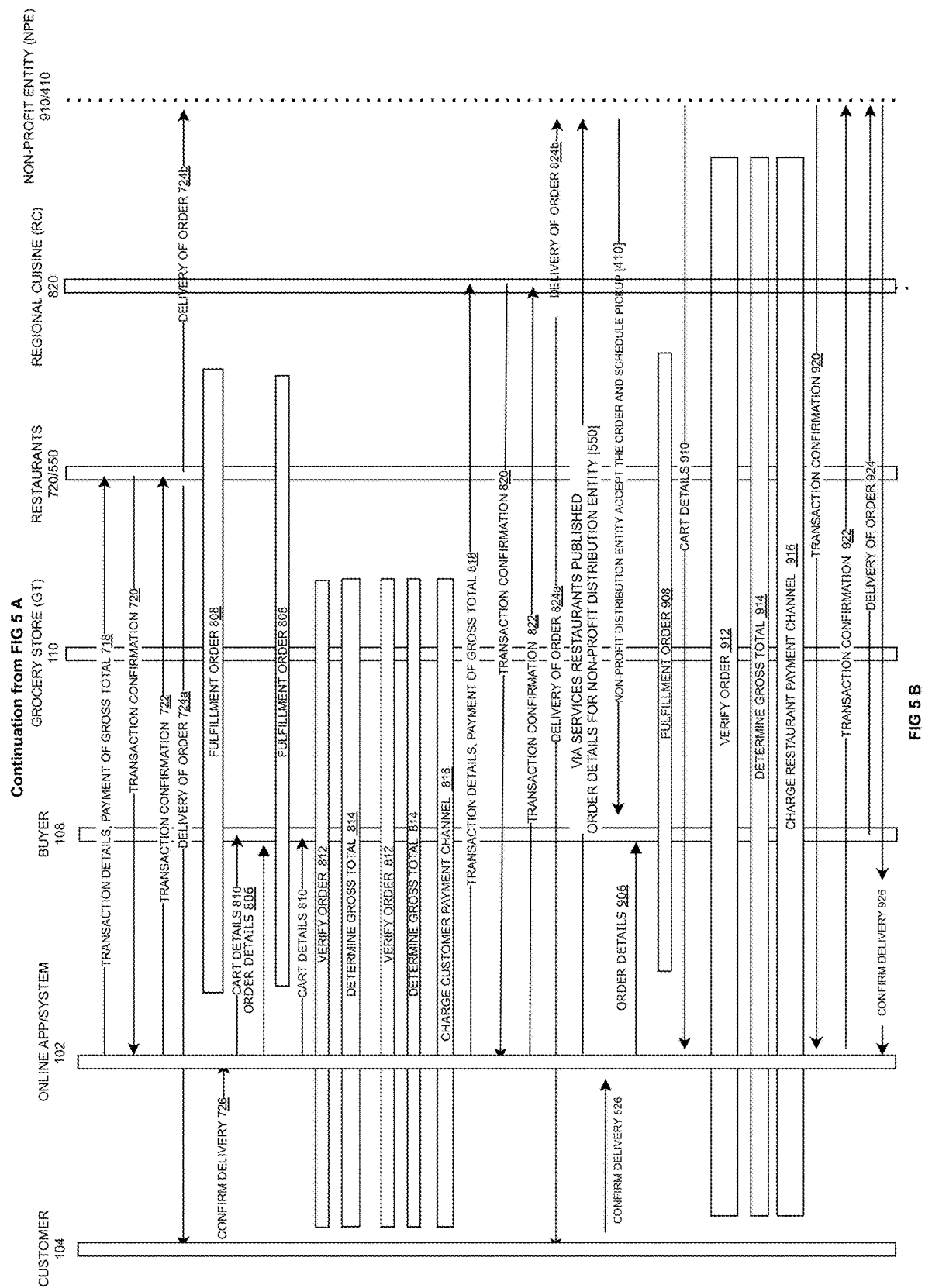

FIG. 5 is an object interaction diagram describing a first method for fulfilling an order via a shopping assistance platform, according to one embodiment. A customer places 502,706,806,906 and order requesting one or more items. The customer places the order on via the CMA 105 or via a website associated with the cyber shopping system. The BMA 112 determines 504/604/704/904 an order total. The system then transmits 506/706/806/906 the order details to a buyers/delivery personnel. The buyers/delivery personnel fulfill 508/708/808/908 the order (as described previously with reference to FIG. 2). Once the buyers have fulfilled the order, he/she transmits 510/710/810/910 the cart details to the system. The system verifies 512/712/812/912 that the order has been fulfilled satisfactorily. The system then determines 514/714/814/914 a GMV which represents a total value of the order owed to the retailer. The system then charges 516/716/816/916 a payment channel associated with the customer. The system then transmits 518/718/818/918 payment to the retailer in the amount of the GMV, as well as a summary of transaction details. The retailer returns 520/720/820/920 a transaction confirmation to the system. The system shares 522/722/822/922 the transaction confirmation with the buyers/delivery personnel. The buyers then deliver the fulfilled order to the Customer 524*a* or 524*b* Non-Profit entity/724*a* Customer or 724*b* Non-Profit entity/824*a* Customer or 824*b* Non-Profit entity/924*a* Customer or 924*b* Non-Profit entity. The customer, upon receiving the ordered items, returns 526/726/826/926 a confirmation of delivery to the cyber shopping server.

In a traditional transaction flow, the CSS 102 charges a customer payment channel at the time an order is placed. The BAM 112, based on an estimation of the funds required to purchase the order items, transfers funds to a stored value or prepaid card in the possession of a buyers/delivery personnel 108. The buyers/delivery personnel 108 then fulfills the order and pays for the items using the card. Consequently, to collect payment from a customer 104 and enable a buyers/delivery personnel 108 to pay for the ordered items, the GSS 102 will bear the processing costs of the transactions.

In another embodiment, the buyers 108 passes through the same check-out process as any other customer at the store. The buyers/delivery personnel must therefore present an identification of the items for purchase as well as a payment instrument with which he/she will pay for the items. Typically, check-out cashiers scan each item individually and a point of-sale (POS) system determines and displays a total sale price. The process of scanning each item individually is time-consuming.

In some embodiments, a buyers/delivery personnel 108 utilizes the BAM 112 to accelerate the traditional checkout process at a retailer 110. As described with reference to FIG. 2, the buyers/delivery personnel 108 scans using the BMA 112 each item he/she collects within the retailer 110. As buyers ready for checkout, he/she submits final checkout and payment information to an external payment gateway or payment processor, which processes the transaction and returns the receipt of items purchased. Retailer returns QR Barcode as part of the receipt that can be used to track the purchased items (including their quantity, price, SKU, etc.) at retailer system. The OFSE 206 stores payment and transactional information associated with each order in a transaction records database 208. A cashier or other employee associated with the retailer 110 therefore reads, captures, or scans the receipt/QR code and extracts an identification of the items for purchase. As needed, the buyers 108 can presents a payment channel which is used to pay for the items.

Figure 6:
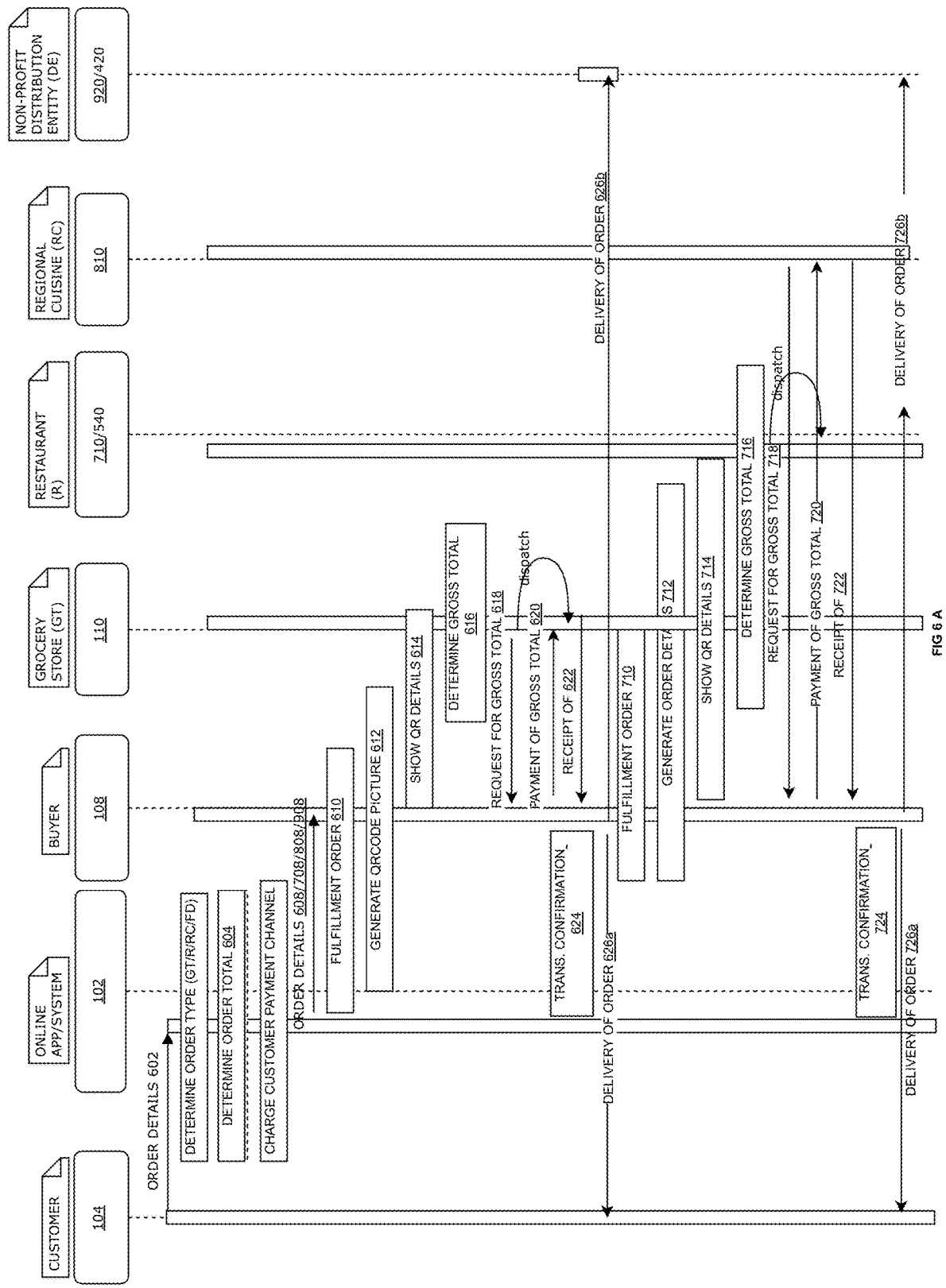
FIG. 6A is a sequence diagrammatic view of an exemplary embodiment of the present invention, illustrating a credit card transaction thereof.
FIG. 6B is a continuation of FIG. 6A.
Figure 6:
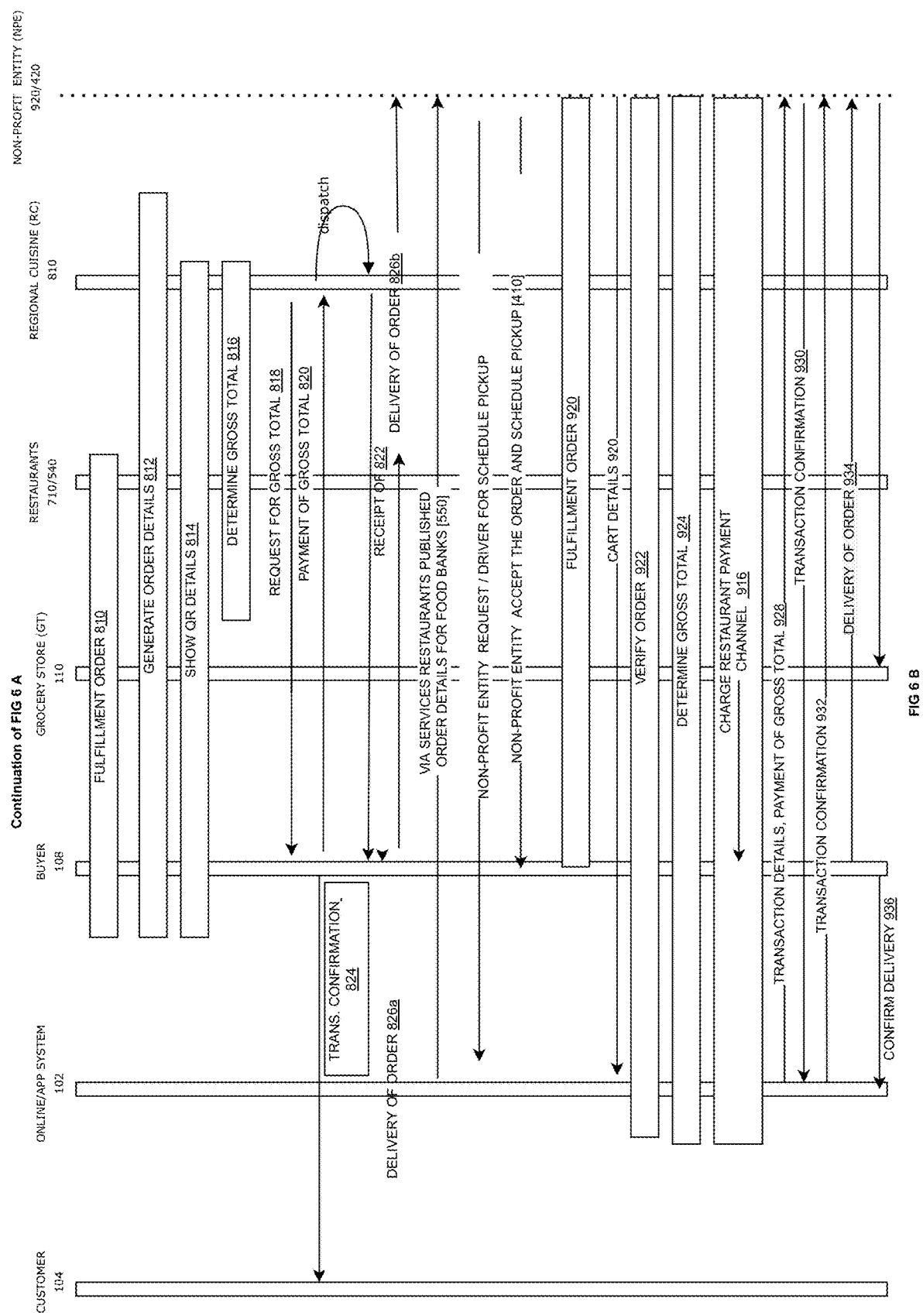

FIG. 6 is an object interaction diagram describing a method of accelerated checkout, according to one embodiment. A customer places an order requesting one or more items—the order details 602. The customer places the order via the CMA 105 or via a website associated with the shopping assistant system. The CSS 102 determines an order total 604 (including one or all—grocery, restaurants or regional cuisine). The system then charges a payment channel associated with the customer. The system then transmits 608/708/808/908 the order details to a buyer. The buyers/delivery personnel fulfill 610/710/810/910 the order (as described previously with reference to FIG. 2). Once the buyers finished collecting items within the retailer 110, he/she uses the BMA 112 to generate 612/712/812/912 a QR code. As described previously, the encoded image contains information describing each item in the cart, such as its price, quantity, weight, SKU, serial number, and so on. The buyers/delivery personnel display 614/714/814/914 the QR image to a cashier (or other employee) of the retailer, who scans it to determine which items have been collected for purchase. The cashier scans the encoded image using an image reader or other electronic device which extracts the information encoded in the image. A computer system subsequently determines 616/716/816/916 a GMV which is owed to the retailer. The cashier requests 618/718/818/918 payment of the GMV from the buyers/delivery personnel. The buyers/delivery personnel present a payment instrument (such as a credit or debit card) and pays 620/720/820/920 the GMV. The cashier transmits 622/722/822/922 a physical or electronic receipt to the buyers/delivery personnel. The buyers/delivery personnel, using his/her buyers/delivery personnel mobile application, returns 624/724/824/924 a confirmation of successful purchase of the cart to the BMA 112. At some subsequent point in time, the buyers/delivery personnel 108 delivers to Customer 626*a* or Non-Profit entity 626*b*, Customer 726*a* or Non-Profit entity 726*b*, Customer 826*a* or Non-Profit entity 826*b*, the Customer 926*a* or Non-Profit entity 926*b* the purchased items.

It should be noted that one or more aspects of the previously described process may vary. For example, in some embodiments, the buyers/delivery personnel 108 may use a self-service automated machine which is configured to transfer the products items directly to retailer as buyer's collect-scan and load the items in cart. Additionally, instead of encoding cart details into an encoded image, the BMA 112 may instead transmit the cart data via one of multiple communications technologies or protocols, including but not limited to: RFID, Bluetooth, Wi-Fi, and so on. In one embodiment, the buyers 108 can tap his/her mobile device to a device at the physical check-out, whereby the BMA 112 transmits the cart details to the device. The buyers can then pay for the items using one of multiple possible payment methods (debit/credit card, cash, etc.). For Restaurant and Regional Cuisine, Buyers verifies items & if not paid then use the card to pay at the register.

The description of the embodiments of the present invention has been presented for the purpose of illustration; it is not intended to be in-depth or to limit the invention to the precise forms disclosed. Persons knowledgeable in the relevant technology can appreciate that many modifications and variations are possible considering the above disclosure.

Some portions of this description describe the embodiments of the invention in terms of algorithms and symbolic representations of operations on information.

These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

In certain embodiments, a platform, environment or network may refer to any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

The server and the computer of the present invention may each include computing systems. This disclosure contemplates any suitable number of computing systems. This disclosure contemplates the computing system taking any suitable physical form. As example and not by way of limitation, the computing system may be a virtual machine (VM), an embedded computing system, a system-on-chip (SOC), a single-board computing system (SBC) (e.g., a computer-on-module (COM) or system-on-module (SOM)), a desktop computing system, a laptop or notebook computing system, a smart phone, an interactive kiosk, a mainframe, a mesh of computing systems, a server, an application server, or a combination of two or more of these. Where appropriate, the computing systems may include one or more computing systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

In some embodiments, the computing systems may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, the computing systems may be a web server running web server applications such as Apache, Microsoft's Internet Information Server™, and the like.

In particular embodiments, the computing systems includes a processor, a memory, a user interface and a communication interface. In particular embodiments, the processor includes hardware for executing instructions, such as those making up a computer program. The memory includes main memory for storing instructions such as computer program(s) for the processor to execute, or data for processor to operate on. The memory may include mass storage for data and instructions such as the computer program. As an example and not by way of limitation, the memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface includes hardware, software, or both providing one or more interfaces for communication between a person and the computer systems. As an example and not by way of limitation, an user interface device may include a keyboard, keypad, microphone, monitor, mouse, printer, scanner, speaker, still camera, stylus, tablet, touchscreen, trackball, video camera, another suitable user interface or a combination of two or more of these. A user interface may include one or more sensors. This disclosure contemplates any suitable user interface and any suitable user interfaces for them.

The communication interface includes hardware, software, or both providing one or more interfaces for communication (e.g., packet-based communication) between the computing systems over the network. As an example and not by way of limitation, the communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example and not by way of limitation, the computing systems may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing systems may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing systems may include any suitable communication interface for any of these networks, where appropriate.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for transparently reducing consumable waste comprising:
    an inventory database coupled to a blockchain chain system;
    a retail server in electrical communication with the inventory database;
    a processor,
    a memory comprising computing device-executable instructions that, when executed by the processor, cause the processor to implement:
        a system communication interface for accessing a donation collaboration platform over a network;
        a user interface for displaying and interacting with the donation collaboration platform;
        an order management engine for generating a donation collaboration on the donation collaboration platform, wherein the donation collaboration comprises at least one of a consumable identifier, one or more restriction rule, and a donation request;
        a buyer management engine for adding an encoded image to the donation collaboration, wherein the encoded image comprises an identified list comprising:
            each of the consumable identifiers determined to be non-applicable when evaluated against each restriction rule; and
            at least one donated consumable determined to be a surplus consumable based in part on the inventory database and the donation request; and
        the retail server configured to:
            verify the encoded image based on the inventory database; and
            generate, for the blockchain system, a blockchain transaction of the donation collaboration, wherein the blockchain transaction comprises the one or more donated consumable and a non-profit destination linked together,
    whereby the non-profit destination reduces consumable waste in a manner that is transparent due to the blockchain transaction.

2. The system of claim 1, further comprising a value channel coupled to the order management engine, wherein the value channel defines a value for each consumable identifier as a function of the inventory database, wherein said value is retrievable stored in the blockchain transaction.

3. The system of claim 1, further comprising a kitchen rental collaboration platform, wherein the order management engine generates a kitchen rental collaboration on the rental collaboration platform, wherein the kitchen rental collaboration includes a kitchen rental request, wherein the buyer management engine determines an unused kitchen space based in part on the inventory database and the kitchen rental request; and wherein the retail server is configured to link the non-profit destination with a consumable generated through the kitchen space.

* * * * *